United States Patent [19]

Adams et al.

[11] Patent Number: 5,399,926
[45] Date of Patent: Mar. 21, 1995

[54] CONNECTED PROCESSING SYSTEMS INCLUDING MUTUAL POWER OFF AND SIGNAL PATH DISCONNECT DETECTION

[75] Inventors: John T. Adams, Minneapolis; Rolf L. Strand, Crystal, both of Minn.

[73] Assignee: Honeywell Inc., Del.

[21] Appl. No.: 175,914

[22] Filed: Dec. 30, 1993

[51] Int. Cl.⁶ .......................................... H03K 19/092
[52] U.S. Cl. ................................... 326/62; 375/7; 326/21; 326/75
[58] Field of Search .................. 307/443, 475, 480; 361/91-92; 375/7, 36, 75; 395/325

[56] References Cited

U.S. PATENT DOCUMENTS

| | | | |
|---|---|---|---|
| 4,280,221 | 7/1981 | Chun et al. | 375/17 |
| 4,307,450 | 12/1981 | Carp et al. | 364/431.05 |
| 4,419,761 | 12/1983 | Kuze | 364/143 X |
| 4,471,243 | 9/1984 | Isham | 307/475 |
| 4,504,959 | 3/1985 | Heckenbach | 375/36 |
| 4,527,247 | 7/1985 | Kaiser et al. | 364/550 |
| 4,945,264 | 7/1990 | Lee et al. | 307/475 |
| 4,947,406 | 8/1990 | Yokoyama | 375/7 |
| 4,982,115 | 1/1991 | Lee | 307/475 |
| 5,172,291 | 12/1992 | Bakely et al. | 361/91 X |
| 5,200,646 | 4/1993 | Wand et al. | 361/111 X |
| 5,207,379 | 5/1993 | Hurmi et al. | 236/38 X |
| 5,283,792 | 2/1994 | Davies, Jr. et al. | 395/575 X |
| 5,347,181 | 9/1994 | Ashby et al. | 307/475 X |

*Primary Examiner*—David R. Hudspeth
*Attorney, Agent, or Firm*—Edward L. Schwarz

[57] ABSTRACT

An interface circuit is designed to connect a first logic circuit such as a microcontroller with a second similar microcontroller using three wires and allowing for simultaneous transfer of data from each of the microcontrollers to the other. A transmitter element in each interface circuit has a bias resistor which cooperates with a pull-up resistor in the other interface circuit to provide an indication for one of the logic circuits when the other of the logic circuits and its associated interface circuit loses power or when one of the three connecting wires is disconnected.

5 Claims, 2 Drawing Sheets

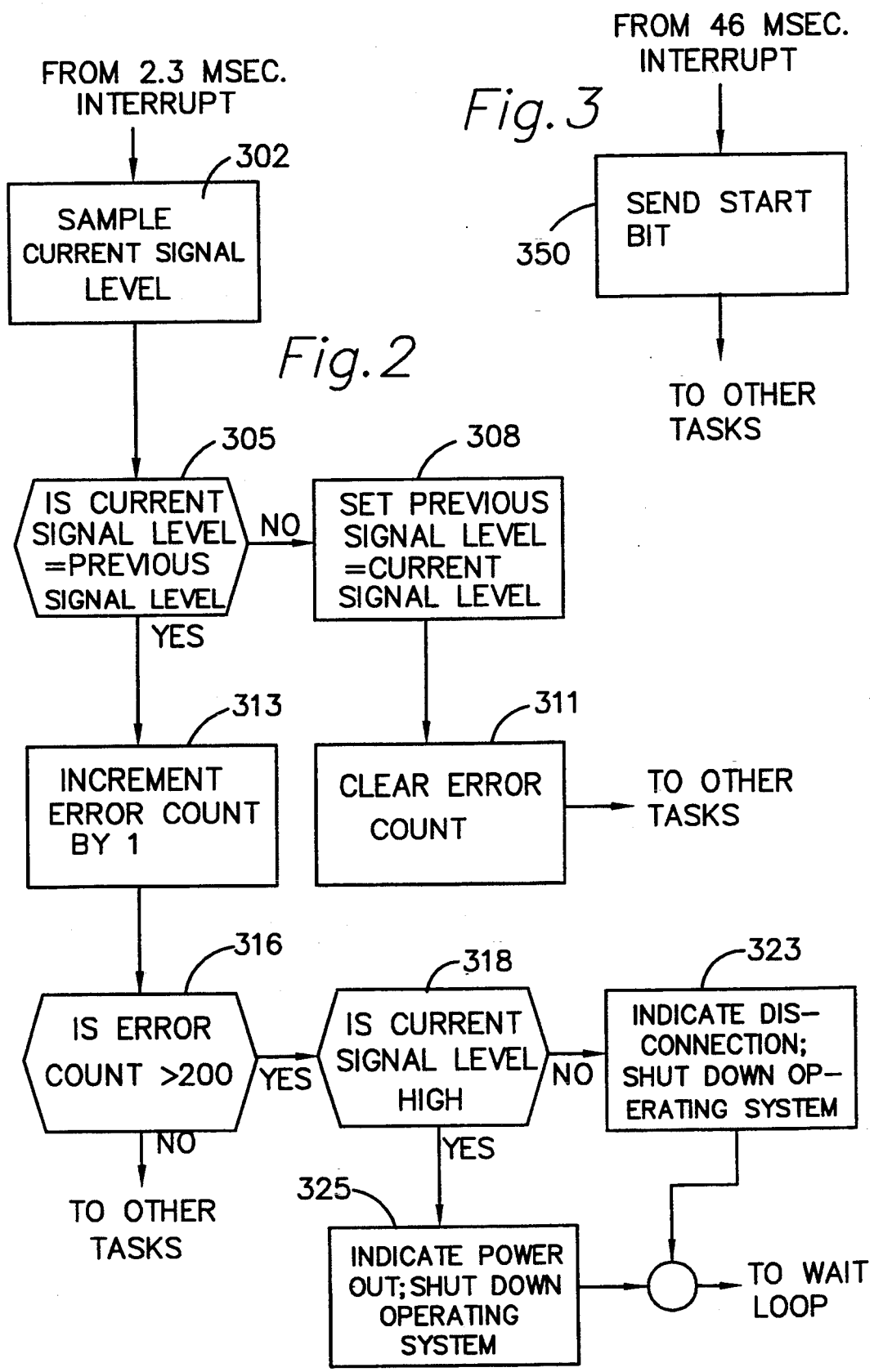

CONNECTED PROCESSING SYSTEMS INCLUDING MUTUAL POWER OFF AND SIGNAL PATH DISCONNECT DETECTION

BACKGROUND OF THE INVENTION

In certain applications, it may be desirable that operating systems which are designed for stand-alone operation are instead installed for use in tandem. This may be desirable to provide greater reliability or efficiency. Or, if greater capacity is needed, it may be less costly to add or combine a second similar or identical system to the first rather than to install a larger one. This is certainly true where replacing already-installed system may result in scrapping the old one. And where greater manufacturing volume exists for the smaller system, installing two identical units allows the costs for the installation to reflect returns to scale not possible with the larger system. As an example, it is sometimes desirable to install two identical furnaces or air conditioning units whose total capacity will handle the thermal load rather than a single unit of the given capacity. In this situation, two furnaces may more closely match the capacity of an associated air conditioning unit, or vice versa if two air conditioning units are employed.

Running two operating systems in tandem however, is not always easy to accomplish. It is sometimes desirable for controlling such a tandem system in a consistent fashion that the two units operate synchronously, with each step in the operating sequence of each starting at very nearly the same time. Turning to the temperature control example once more, in a tandem forced air heating or cooling system, if power is applied to one blower before the other, the air from the operating blower is forced through the other blower. This reverse air flow will cause the unpowered blower to rotate backwards. The result for the induction motor commonly employed to drive these fans is that it will continue to run backwards when it finally receives operating power. It is possible to place an overriding brake on each of the motors to prevent this, but the additional mechanical components reduce the reliability of the system. Therefore, in this case, it is desirable to synchronize the operation of each system to cause the blowers to both start at very nearly the same time to prevent the unpowered fan from running backward. This timing requirement can be achieved only by some type of communication between the two systems' controllers.

It is well known now to use small microcontrollers to control the operation of various types of operating systems. In the temperature control example, microcontrollers now commonly control the sequencing of individual steps in the operation of air conditioning units and furnaces used for cooling and heating the spaces in buildings of various types. These microcontrollers are very fast and reliable and can therefore provide many more functions for the operating system involved than were possible when mechanical timers were used for controlling and sequencing these functions. At the same time, the greater capability of these microcontrollers allows the operation of these systems to be supervised more closely than was previously possible. This has resulted in safer and more efficient operation for whatever type of operating system is involved. One capability which is inherent in microcontrollers is that of fast and reliable communication with an external device such as a similar microcontroller. It is therefore appealing to use this communication capability to address the problem of synchronizing the operation of tandem operating systems. There are now in existence, three wire communication systems which are robust in terms of reliability and noise insensitivity.

One problem which these systems have had heretofore is that if one of the systems should lose power or the communication paths between the systems should become disconnected, the other may not find it easy to discover this situation. It is desirable that the communication system allow for at least some self-checking for detecting loss of power to one of the control units or disconnection of the communication system's conductors. Since one system has by definition lost power in this situation, how to determine loss of power in that system by the other is not obvious.

BRIEF DESCRIPTION OF THE INVENTION

We have found a means for detecting loss of power to one of a pair of control units connected for intercommunicating by two or three wires. Each of the control units comprises a first logic circuit and a first interface circuit for the first logic circuit. Each of the control units receives power for operating its circuits from a power terminal. The first interface circuit is intended for connection to a similar second interface circuit for a second logic circuit to allow communication between the two logic circuits. Each of the logic circuits have a logic output terminal providing a logic level output signal thereat, and a logic input terminal. Each logic output terminal voltage floats when its associated logic circuit is not receiving power.

Each of said interface circuits includes: a neutral terminal for connection to the neutral terminal of the similar other interface circuit; a data transmitter circuit having an output signal terminal and a variable impedance connected between the output signal terminal and the neutral terminal and having a control terminal receiving the logic level output signal from the logic output terminal of the logic circuit, the impedance of said variable impedance following in an inverse manner the voltage difference between the neutral terminal and the control terminal; and a data receiver circuit having an input signal terminal for providing a voltage to the output signal terminal of the similar second interface circuit, and receiving at the input signal terminal an output data signal comprising a varying voltage whose level is controlled by the impedance of the variable impedance in the data transmitter circuit of the similar second interface circuit, and an output terminal providing to the logic input terminal a logic level input signal having a voltage whose level corresponds to voltage levels in the output data signal.

The first interface circuit then comprises a pull-up resistor in the data receiver circuit connected between the power terminal and the input signal terminal and a bias resistor connecting the output data terminal to the variable impedance's control terminal.

Loss of voltage at the second control unit's power terminal allows current flow from the pull-up resistor in the first interface circuit to flow through the bias resistor in the second interface circuit's transmitter circuit to bias the control terminal of the variable impedance therein and pull its voltage away from the voltage at the neutral terminals, reducing the impedance of the variable impedance in the similar second interface circuit, and reducing the voltage at the input signal terminal of the first interface circuit to a level creating a constant logic level input signal to the logic input terminal.

While the above discloses a three wire system, the principles stated are applicable to a two wire system as well. However, in such a system it is necessary to coordinate the communication between the systems to avoid collision of messages.

BRIEF DESCRIPTION OF THE DRAWINGS

FIGS. 2 and 3 are flow charts of software implementing certain aspects of the invention.

DESCRIPTION OF THE PREFERRED EMBODIMENTS

Figure 1:
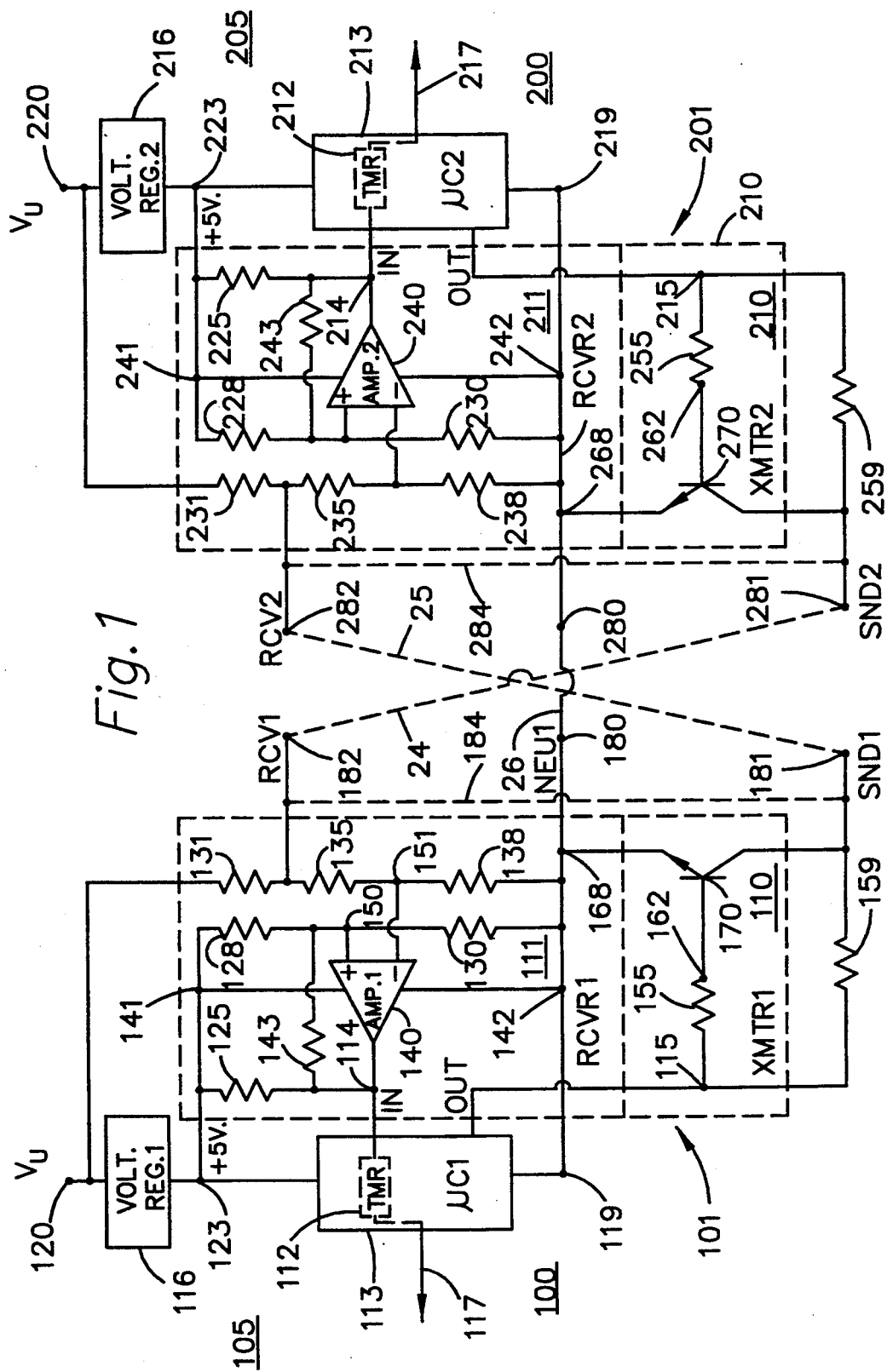
FIG. 1 is a hybrid circuit schematic and block diagram for the invention.

The invention is implemented in two identical control units 100 and 200 shown in FIG. 1. To simplify reference to the components of each, corresponding components of each have been given identical last two digits. Thus, for example microcontroller 113 in system 100 exactly mirrors the function and component in system 200 served by microcontroller 213. It is convenient to hereafter in many cases refer to only the components of system 100 in explaining the structure and operation of the apparatus shown in the FIG. 1 except where it is necessary to describe the interaction and cooperation between them.

The purpose of microcontroller 113 is to provide control signals on port 117 to some type of operating system such as a furnace, engine, ventilating or air conditioning system, etc. and for whose function it may on occasion be convenient to combine the output of two such operating systems. As explained above, in such a situation, it may be necessary to coordinate the operation of the two operating systems so that they operate synchronously. To achieve this synchronous operation, it is necessary that the control units of each are in constant communication with each other. This communication occurs between an interface circuit 101 or 201 in each control unit over three wires 24–26 connecting three signal terminals 180–182 and 280–282 of each of the circuits 101 and 201 respectively. Neutral terminal (NEU 1) 180 of circuit 100 is connected to the corresponding neutral terminal (NEU 2) of circuit 200 by wire 26. The neutral terminals 180 and 280 serve as grounds for their respective circuits. Output signal terminal (SND 1) 181 of circuit 100 is connected to an input signal terminal (RCV 2) 282 of circuit 200 by wire 25. This connection is mirrored by a similar connection between the output signal terminal (RCV 1) 182 of circuit 100 and input signal terminal (RCV 2) 281 of circuit 200 through wire 24.

Microcontroller 113 comprises any commercially available model of such a device whose electrical characteristics are suitable for controlling the operating system involved. The control signals for controlling the operating system are symbolically shown as provided on port 117. Port 117 also includes a status path carrying status signals which indicate the status of the other control unit. (Remember that similar statements may be made for microcontroller 213 and its port 217.) Power for microcontroller 113 is supplied from a power terminal 120 representing an unregulated DC voltage source whose voltage is shown as $V_u$ and whose level may be in the range of 30v. The unregulated voltage $V_u$ at terminal 120 is provided from a source independent from the source which supplies a similar unregulated voltage at power terminal 220 for circuit 200. A voltage regulator 116 receives the unregulated voltage from terminal 120 and provides at its output terminal 123 the regulated +5v. on which microcontrollers typically operate.

Voltage regulator 116 and microcontroller 113 together comprise a logic circuit 105 operating on the unregulated voltage at power terminal 120. Loss of unregulated voltage at either terminal 120 or 220 reflects the occurrence of such things as an open safety switch in one of the operating systems which might interrupt the power to its control unit. In such an instance, it is quite likely that the other operating system will continue to operate normally.

Microcontroller 113 has further, a logic input terminal (IN) 114 at which logic level input signals are received and a logic output terminal (OUT) 115 at which logic level output signals are provided as a result of internal digital processing. Where the term "logic level" or "logic voltage" is used in this description, one can assume that two voltage levels are involved. A low logic level or logic voltage is one near to the voltage at the neutral terminals 180 and 280. A high logic level is one displaced by a greater voltage from the neutral terminal voltage, and may be either positive or negative, but is in the embodiment presented here, considered to be near the +5v. which powers the microcontrollers 113 and 213. When one of these microcontrollers provides a high logic level on a logic output terminal 115 or 215, an internal switch connects the terminal to the +5v. supply at terminal 123 or 223 with perhaps 300–500 ohms impedance. A low logic level signifies connection to the ground terminal 119 or 219 with a similar or lower impedance of perhaps 60 ohms. Further, logic output terminal 115 floats when microcontroller 113 dose not receive power. That is, the impedance between output terminal 115 or 215 and ground terminal 119 or 219 is very high when power is not present at power terminal 120, and the voltage level is essentially indeterminate. These are common characteristics of the logic output terminals of these microcontrollers.

The unregulated voltage at terminal 120 is also used to carry the data transmitted from control unit 200 to control unit 100. Similarly, the unregulated voltage at terminal 220 in addition to providing power for logic circuit 205 also carries the data transmitted from control unit 100 to control unit 200. Thus these data signals carried on paths 24–26 are not logic level signals, but instead in this implementation, are at a much higher voltage. Use of this higher unregulated voltage tends to better reject noise and allow greater length for wires 24–26, but it is also possible to use logic level voltages in certain circumstances for communication between control units 100 and 200. At any rate, all of these voltage levels are intended to be merely representative. However, it is necessary that the input voltage to regulator 116 be higher than the output voltage from regulator 116.

Microcontroller 113 further includes a timing circuit 112 which monitors the voltage at the logic input terminal 114 and if this voltage has either its low or high level for longer than a predetermined time, provides a status signal indicating this occurrence on port 117. This timing circuit 112 is typically implemented as a software means using the internal clock forming a part of these microcontrollers to determine the elapsing of time. Of course, such a timer is equally easy to implement as hardware, although not nearly as cheap as the software version.

There is for each of these control circuits 100 and 200, in addition to the logic circuit 113 or 213 for controlling the associated operating system, the interface circuit 101 or 201 which comprises three main elements. These elements are a receiver (RCVR 1) 111 comprising an amplifier (AMP 1) 140 and a number of associated resistors, a transmitter (XMTR 1) 110 comprising a transistor 170 and its associated base resistor 155, and a bias resistor 159. Describing first the receiver 111, a comparator or amplifier 140 therein receives between power terminals 141 and 142, +5v. regulated power from voltage regulator 116. Amplifier 140 has a plus (+) input terminal 150 and a minus (−) input terminal 151, and an output terminal connected to the logic input terminal 114 of microcontroller 113 to provide a logic level input signal thereat. As is conventional, amplifier 140 provides a high logic level voltage at its output terminal responsive to presence at the plus input terminal 150 of voltage more positive than the voltage at the minus input terminal 151, and a low logic level at its output terminal otherwise.

Voltage at the plus input terminal 150 of amplifier 140 is very nearly a fixed value provided by a voltage divider comprising resistors 128 and 130 connected between terminal 123 of voltage regulator 116 and the neutral terminal 180. A conventional feedback resistor connected between terminal 114 and plus input terminal 150 causes a slight amount of hystersis in the voltage at terminal 150 to assure fast and clean transitions between high and low logic levels. Voltage following the input signal at terminal 182 is applied to the minus input terminal 151 of amplifier 140 by a divider comprising resistors 135 and 138 which substantially reduces the level of the unregulated voltage carrying the data between the control units 100 and 200. Impedance changes in transmitter 210 between terminals 280 and 281 cause voltage swings at input signal terminal 182, which cause the voltage at terminal 151 to fluctuate above and below the voltage at terminal 150. High and low voltages at input signal terminal 182 cause low and high logic levels respectively to be provided by the output terminal of amplifier 140 in a logic level input signal to the logic input terminal 114 of microcontroller 113. Amplifier 140 thus inverts the sense of the voltage at input signal terminal 182, where a more positive voltage thereat results in a low logic level voltage at terminal 114, and a less positive voltage at terminal 182 results in a high logic level voltage at terminal 114. With regulator 116 providing very nearly +5v. at terminal 123, it is convenient to select resistors 128 and 130 to provide 1.00v. at terminal 150. Resistors 135 and 138 may be selected to reduce the signal voltage at terminal 182 by a factor of ten as applied to terminal 151 given an unregulated voltage of approximately 30v. at terminal 120.

The transfer of data from control unit 100 to control unit 200 results from changes in the impedance of a transistor 170 in transmitter 110. The impedance of transistor 170 is controlled by the voltage of the logic level output signal applied to the base thereof by microcontroller 113 through its logic output terminal 115. The voltage at terminal 181 created by current flow through resistor 231 rises and falls with similar changes in the impedance of transistor 170.

When power is lost at terminal 220, current no longer flows through resistor 231. This condition can be detected by control unit 100 in the following manner.

When microcontroller 213 loses power the impedance which its output terminal 215 presents to the base of transistor 270 is very high, typically on the order of several megohms. If it were to be controlled by microcontroller 213 only, impedance of transistor 270 would also be extremely high. However, bias resistor 259 feeds back current flowing from power terminal 120 through resistor 131 and wire 24 to the base of transistor 270 through base resistor 255. This current biases transistor 270 into sufficient conduction to pull the voltage at terminal 281 to a level creating a voltage at terminal 151 lower than the voltage at terminal 150, and therefore a high logic level at the logic input terminal 114. Timer element 112 in microcontroller 113 senses this continuous high logic level voltage at logic input terminal 114, and provides a status signal at port 117 encoding a value indicating possible loss of power. This signal might be one to alert the facility manager to the loss of power to microcontroller 213. Timer element 112 is shown as a part of microcontroller 113, and as stated above, will typically be implemented as part of the software in microcontroller 113.

The value of resistor 259 must be high enough so that microcontroller 213 during normal operation can pull control terminal 262 voltage sufficiently low to increase impedance of transistor 270 to a level producing a voltage at terminal 281 which is higher than the nearly fixed voltage at terminal 151 of amplifier 140 to thereby form a logic level low at the output terminal of amplifier 140. We have found that by properly selecting resistor 259, terminal 281 will be held at about 5v. when microcontroller 213 does not receive power, which is sufficient to place a voltage at terminal 151 of amplifier 140 which is less than the voltage at terminal 150.

On the other hand, should terminal 182 become disconnected from terminal 281 for example, resistor 131 pulls up the voltage at terminal 182 to a level which produces a voltage at terminal 151 greater than the voltage at 150. In this case, amplifier 140 produces a constant low logic level at its output terminal which logic input terminal 114 receives. Timer 112 interprets this constant low logic level voltage as indicating disconnection of wire 24 and again provides a status signal on port 117 encoding a value indicating possible disconnection of a signal path between the control units 100 and 200. As a corollary to this malfunction detection, it is necessary that during normal operation, microcontrollers 113 and 213 each alter the signal provided on their output terminals 115 and 215 with sufficient frequency to avoid interpretation by the other microcontroller as a malfunction. Again this is easy to accomplish by proper programming of each of the microcontrollers 113 and 213.

In order for the voltage at output terminal 281 to produce a low logic level at terminal 114 when control unit 200 is not powered, some care must be taken in the selection of the various resistors in the interface circuits 101 and 201. The following table provides values used in a current commercial design, and are at least one preferred embodiment:

| Resistor Ref. No. | Value |
| --- | --- |
| 128, 228 | 52.3K 1% |
| 130, 230 | 13K 1% |
| 131, 231 | 2K 2 W |
| 135, 235 | 100K 1% |
| 138, 238 | 10K 1% |

-continued

| Resistor Ref. No. | Value |
| --- | --- |
| 159, 259 | 10K |

(K = 1000 ohms)

All of these resistor values are interrelated. It is necessary to select them so as to assure that the voltages at output terminals 181 and 281 are properly interpreted by the comparators 140 and 240 regardless of the situation. The preceding discussion will allow those familiar with circuit design to select values appropriate to their particular situation.

The commercial embodiment does not use a single transistor 170 as shown, because the commercial ULN-2003A microcircuit which provides other circuits of the commercial embodiment turns out to have an otherwise unused Darlington amplifier in it. It was most efficient to simply use this amplifier in place of a discrete transistor 170 or 270. The ULN-2003A designation is generic, and the circuit is available from a number of different manufacturers.

One last variant of this invention should be at least briefly mentioned. There is shown in FIG. 1, conductors 184 and 284 in dotted line form denoting them as optional, and which if present allow control units 100 and 200 to be connected with only two wires, as opposed to the three wires assumed in the description above. From a circuit standpoint, nothing more need be done than to add conductors 184 and 284, and delete either wire 24 or 25. However, if only two wires are used, the software executed by microcontrollers 113 and 213 becomes more complex, since measures must be taken to avoid collisions between messages, where each of the control units tries to simultaneously communicate with each other. The need to operate in the so-called half-duplex mode to avoid collisions reduces the data capacity by half, which may be important. This potential for collisions may also reduce the reliability or robustness of the two wire version, and hence the two wire version is not preferred at the present time. However, one should understand that this invention can be employed successfully in both two wire and three wire communication systems.

To more clearly explain the software aspects of this invention, it is helpful to provide a flow chart of software instructions which perform the testing of the logic level input signal on terminal 114. The decision elements and processing elements of FIG. 2 represents a sequence of instructions which are executed by the microcontroller 113, every 2.3 msec. in the preferred embodiment. It is conventional that all of the tasks performed by dedicated microcontrollers are scheduled to be executed at fixed intervals. An executive routine keeps track of the time by reference to an internal clock and as each task becomes due for execution, control is transferred to the software instruction which perform that task. As mentioned earlier, it is immaterial from a theoretical standpoint whether the testing of the level at terminal 114 is done by hardware or by software operating in a hardware microcontroller 113.

Each of the decision elements in FIG. 2 is shown by a hexagonal box such as at 305, and represents a sequence of instructions which perform the test indicated by the text therein. For the period of time during which these instructions are executed, the microcontroller in essence becomes a hardware element which performs the function stated. Similarly for the processing elements in FIGS. 2 and 3 of which element 302 is an example, the instructions which perform the stated function cause the microcontroller becomes the functional equivalent of hardware which performs that function.

Turning first to FIG. 2, execution of the instructions symbolized therein occurs every 2.3 msec. One should understand that this time interval is purely arbitrary and was chosen to be compatible with the type of microcontroller chosen and the message format between the interface circuits. Each bit transmitted between control units 100 and 200 occupies an interval of 2.3 msec., hence the choice of 2.3 msec. The instructions symbolized by processing element 302 cause the current signal level supplied to the logic input terminal 114 to be recorded in a temporary RAM location of the microcontroller 113 or 213. The instructions of decision element 305 test the current signal level to be equal to the contents of a second RAM location which stores the signal level which was previously sampled by executing the instructions of processing element 302. If the current and previous signal levels of the logic level input signal at terminal 114 are not equal, the contents of the RAM location recording the previous signal level is set to the contents of the RAM location recording the current signal level by executing the instructions symbolized by processing element 308. Instruction execution then continues with the instructions symbolized by processing element 311, which clear the value recorded in a RAM location in which an error counter value is recorded. The execution of further instructions then continues with other tasks as shown.

If the current and previous signal levels were found to be equal by the instructions of decision element 305, then the RAM location recording the error count value is incremented by one by the instructions of processing element 313. Next, this new value of the error count is tested by the instructions of decision element 316 to be greater than 200. The value of 200 used here is also purely arbitrary, and corresponds in the preferred embodiment to ten complete cycles during which no change in the signal level occurs. The value of 200 is the equivalent of an interval of 460 msec. during which no change in the signal level has occurred. If the error count is not greater than 200, then no error has occurred, and instruction execution continues with other tasks as shown. If the error count is greater than 200, then an error has occurred, and the appropriate actions must be taken.

First, the type of error is determined by decision element 318. If the signal level at terminal 114 is high, this means that the voltage at terminal 182 has been pulled low by transistor 270 under the influence of resistor 259. As previously explained, this indicates that power has been lost to control unit 200. Accordingly, the instructions symbolized by processing element 325 are next executed. These cause a power out indication to be displayed by an appropriate status signal on port 117. In addition, further instructions are executed which immediately shut down the operating system associated with control unit 100. This is because the safety systems in the two operating systems assume that both are operating synchronously, and if this is not true, problems may result. If the current signal level at terminal 114 was found to be low, then the instructions which processing element 323 represent are executed. These activate a display which indicates that the two systems have become disconnected. The operating system for the control system 100 or 200 involved is again shut down, but in the particular application forming the preferred embodiment here, need not be done as quickly as in the power out situation to avoid problems. Instruction processing then continues with a wait loop as shown while the system is repaired.

FIG. 3 is a single processing element 350 whose instructions are executed every 46 msec. as shown. Every message sent by either of the control systems to the other is scheduled to be sent every 46 msec. in the preferred embodiment. Each message is prefaced by a start bit which is a transition from a higher voltage at terminal 182 or 282, to a lower voltage for 2.3 msec. This start bit causes the instructions of processing element 311 in the other control unit's microcontroller to clear the error count.

The preceding has described our invention. What we wish to claim is:

1. In a first control unit comprising a first logic circuit and a first interface circuit for the first logic circuit and including a first power terminal, for connecting to a similar second control unit comprising a second similar logic circuit and a second similar interface circuit for the second logic circuit and including a second power terminal, said interface circuit for allowing communication between the two logic circuits, each of said logic circuits having a logic output terminal and providing a logic level output signal thereat, and a logic input terminal, and wherein each logic output terminal voltage floats when its associated logic circuit is not receiving power, wherein each of said interface circuits includes: a neutral terminal connected to the neutral terminal of the similar interface circuit; a data transmitter circuit having an output signal terminal and a variable impedance connected between the output signal terminal and the neutral terminal and having a control terminal receiving the logic level output signal from the logic output terminal of the logic circuit, the impedance of said variable impedance following in an inverse manner the voltage difference between the neutral terminal and the control terminal; a data receiver circuit having an input signal terminal for providing a voltage to the output signal terminal of the similar second interface circuit, and receiving at the input signal terminal an output data signal comprising a varying voltage whose level is controlled by the impedance of the variable impedance in the data transmitter circuit of the similar second interface circuit, and an output terminal providing to the logic input terminal a logic level input signal having a voltage whose level corresponds to voltage levels in the output data signal, wherein the first interface circuit comprises a) a pull-up resistor in the data receiver circuit connected between the power terminal and the input signal terminal; and
   b) a bias resistor connecting the output data terminal to the variable impedance's control terminal,
   whereby loss of voltage at the second power terminal allows current flow from the pull-up resistor to flow through the bias resistor in the second interface circuit's transmitter circuit to bias the control terminal of the variable impedance therein and pull its voltage away from the voltage at the neutral terminals, reducing the impedance of the variable impedance in the similar second interface circuit, and reducing the voltage at the input signal terminal to a level creating a constant logic level input signal to the logic input terminal.

2. The control unit of claim 1, wherein the logic circuit provides a logic level output signal having higher and lower voltage levels, and wherein the value of the bias resistor is such as to allow current flow therethrough creating voltage at the control terminal of the variable impedance which simulates a lower voltage level of the output data signal.

3. The control unit of claim 2, wherein the first logic circuit comprises a port providing a status signal, and a timer means receiving the logic level input signal, for providing a status signal encoding a first predetermined value responsive to a first predetermined logic level persisting for at least a predetermined time interval in the logic level input signal.

4. The control unit of claim 3, wherein the timer means further comprises means for providing a second predetermined status signal value responsive to a second predetermined logic level of the logic level input signal different from the first logic level for at least the predetermined time interval.

5. The control unit of claim 3, wherein the logic circuit comprises transmission means for providing a logic level output signal having at least one change within each time interval of length equal to the predetermined time interval.

* * * * *